United States Patent
Ozawa

(10) Patent No.: US 6,561,039 B2
(45) Date of Patent: May 13, 2003

(54) PRESSURE GAUGE FOR MEASURING PRESSURE OF FLUID FLOWING THROUGH A PIPELINE

(75) Inventor: Toshihiko Ozawa, Gyoda (JP)

(73) Assignee: Surpass Industry Co. Ltd., Gyoda (JP)

( * ) Notice: Subject to any disclaimer, the term of this patent is extended or adjusted under 35 U.S.C. 154(b) by 0 days.

(21) Appl. No.: 10/121,011

(22) Filed: Apr. 10, 2002

(65) Prior Publication Data

US 2002/0194924 A1 Dec. 26, 2002

(30) Foreign Application Priority Data

Apr. 12, 2001 (JP) ........................................ 2001-113990

(51) Int. Cl.7 ................................................ G01L 7/00
(52) U.S. Cl. ...................................................... 73/756
(58) Field of Search ............................... 73/756, 729.1, 73/715, 716, 717, 723, 718, 724, 861.42, 861.52, 861.61, 861.63, 861.64; 361/283.1, 283.2, 283.3, 283.4

(56) References Cited

U.S. PATENT DOCUMENTS 4,541,283 A * 9/1985 Stuhlmann ................... 73/724
4,799,388 A * 1/1989 Hunter ...................... 73/861.63

* cited by examiner

Primary Examiner—William Oen
(74) Attorney, Agent, or Firm—Kolisch Hartwell, P.C.

(57) ABSTRACT

This pressure gauge comprises a mounting section connected to a joint provided partway along a pipeline, and a measurement section provided on the mounting section, and in which the upwards movement of an actuator rod causes a rotation of a needle. In the mounting section, a concave section is provided with a base which interconnects with the inside of the pipeline, and inside this concave section is provided a diaphragm with a closed base, with an outer surface comprising a bellows section formed as a concertina shape, and with a central aperture for housing the tip of the actuator rod, and the pressure of fluid within the pipeline acts upon the base of the diaphragm compressing the diaphragm. At the tip of the actuator rod housed within the housing aperture is installed a protective cap which is constructed from polytetrafluoroethylene resin or a vinyl chloride or the like with excellent chemical resistance.

6 Claims, 4 Drawing Sheets

PRESSURE GAUGE FOR MEASURING PRESSURE OF FLUID FLOWING THROUGH A PIPELINE

BACKGROUND OF THE INVENTION

1. Field of the Invention

The present invention relates to a pressure gauge which is provided part way along a pipeline, and measures the pressure of a fluid flowing through the pipeline.

2. Background Art

As shown in FIG. 7, in those cases where the pressure of a fluid flowing through a pipeline 1 is to be measured, typically a pressure gauge 2 is provided part way along the pipeline 1.

This pressure gauge 2 is attached by screwing the gauge into a mounting aperture 5 provided within a joint 4 connecting the pipeline 1, and detects the pressure of fluid flowing through a fluid passage 6 which is formed inside the joint 4 and interconnects the two sections of the pipeline 1. The pressure of the fluid is then displayed via a display section 8 comprising a display needle 7.

As shown in FIG. 8, this pressure gauge 2 comprises a mounting section 11 on which is formed the male screw thread for screwing into the mounting aperture 5 of the joint 4, and a measurement section 12 which is fixed to the mounting section 11.

A pressure detection aperture 11a is formed in the mounting section 11, and the fluid pressure from this pressure detection aperture 11a acts upon a diaphragm 13.

This diaphragm 13 is shaped as a circular cylinder with a closed base, and the outer surface of the diaphragm 13 forms a concertina shaped compressible bellows section 14. An actuator rod 15 of the measurement section 12 is inserted through the top of the diaphragm 13.

In this type of pressure gauge 2, the compressible diaphragm 13 is provided so that the fluid never contacts the actuator rod 15 of the measurement section 12 directly, but rather the fluid pressure is transmitted to the actuator rod 15 via the diaphragm 13.

When the pressure of the fluid flowing through the pipeline 1 is transmitted from the pressure detection aperture 11a of the mounting section 11 to the diaphragm 13, the diaphragm 13 is compressed upwards under the pressure of the fluid, and the actuator rod 15 inserted inside the diaphragm 13 is lifted up, and accompanying this upwards movement of the actuator rod 15, the display needle 7 of the display section 8 of the measurement section 12 rotates to display the pressure.

However, in the aforementioned pressure gauge 2, in those cases in which highly corrosive chemicals flow through the pipeline 1, those sections which come in contact with the fluid are formed from polytetrafluoroethylene resin, which is a highly chemical resistant material, although the bellows section 14 of the diaphragm 13 needs to be of a very thin construction in order to ensure good compressibility. As a result, gas permeation occurs through the bellows section 14 of the diaphragm 13, and so the metallic actuator rod 15 inserted inside the diaphragm 13, together with other metallic material sections within the measurement section 12 are subjected to corrosion, causing measurement errors and reducing the lifespan of the gauge.

The present invention takes the above issues into consideration, with an object of providing a pressure gauge with excellent chemical resistance, which is capable of accurately measuring fluid pressure, even if the fluid is a highly corrosive chemical.

SUMMARY OF INVENTION

In order to achieve the above object, a pressure gauge of the present invention comprises a mounting section which is connected to a pipeline, and a measurement section which is provided on the mounting section, and in which the upwards movement of an actuator rod causes a rotation of a display needle. In the mounting section, a concave section is provided in which the bottom thereof interconnects with the inside of the pipeline, and inside this concave section is provided a diaphragm which is shaped as a circular cylinder with a closed base, with an outer surface comprising a compressible bellows section formed as a concertina shape in an axial direction, and with a central aperture which functions as a housing aperture for housing the tip of the actuator rod, and the pressure of fluid within the pipeline acts upon the base of the diaphragm, compressing the diaphragm. At the tip of the actuator rod housed within the housing aperture is installed a corrosion resistant protective cap which covers this tip section.

Because a protective cap covers the tip section of the actuator rod housed inside the housing aperture of the diaphragm, even if a corrosive fluid undergoes gas permeation through the bellows section of the diaphragm, any direct contact with the actuator rod is prevented, and as a result, measurement errors and any reduction in the lifespan of the gauge resulting from corrosion of the actuator rod can be prevented.

In the above pressure gauge, a flexible, corrosion resistant seal may also be provided between the mounting section and the measurement section for partitioning the two sections, and the aforementioned actuator rod can be inserted through the center of the seal, with the seal being held in place between a fixed flange formed in the central region of the actuator rod and the protective cap.

In those cases in which the mounting section and the measurement section are partitioned with a flexible, corrosion resistant seal in this manner, any gaseous fluid which permeates the bellows section of the diaphragm on the mounting section can be prevented from reaching the measurement section, without hindering the movement of the actuator rod, and measurement errors and any reduction in the lifespan of the gauge resulting from corrosion of the measurement section can be prevented with even greater certainty.

The seal around the periphery of the actuator rod may also comprise a slack section which displays a degree of slack in a radial direction.

In such a case, because the seal around the periphery of the actuator rod comprises a slack section which displays a degree of slack in a radial direction, any obstruction of the movement of the actuator rod resulting from the provision of the seal can be almost completely prevented.

The top and bottom of the seal around the periphery of the actuator rod may also comprise hollow sections which link through to the open air.

In such a case, because the hollow sections formed in the top and bottom of the seal link through to the open air, when the seal deforms as a result of following the movement of the actuator rod, any pressure variation between the top and bottom of the seal can be minimized, enabling any obstruction of the movement of the actuator rod resulting from the provision of the seal to be even more completely prevented.

An O ring may also be provided between the outer periphery of the diaphragm at the upper end of the bellows section, and the inner periphery of the concave section of the mounting section.

In such a case, the O ring provided between the outer periphery of the diaphragm at the upper end of the bellows section and the inner periphery of the concave section of the mounting section completely prevents any leakage of fluid through the gap between these two sections, thereby completely preventing any deleterious effects on the measurement section resulting from such leaked fluid.

PREFERRED EMBODIMENTS

As follows is a description of an example of a pressure gauge of the present invention, with reference to the drawings.

Figure 1:
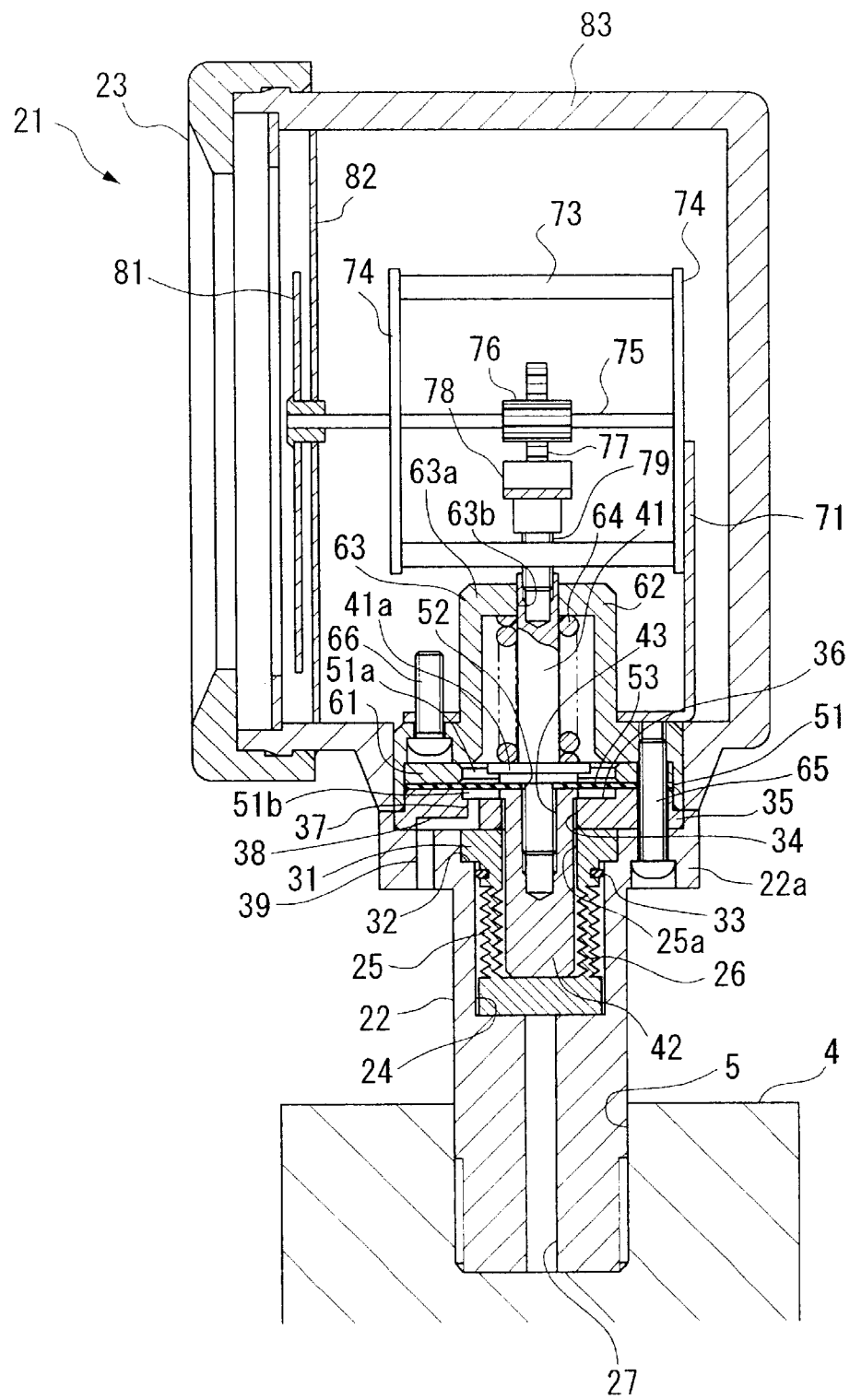
FIG. 1 is a cross-sectional view of a pressure gauge describing the formation and construction of a pressure gauge of an embodiment of the present invention.

In FIG. 1, reference symbol 21 denotes a pressure gauge. This pressure gauge 21 is constructed from a mounting section 22 which screws into a mounting aperture 5 of a joint 4, and a measurement section 23 which is fixed to the mounting section 22.

The mounting section 22 is constructed from Teflon (registered trade mark of fluoroplastics (polytetrafluoroethylene)) resin or a vinyl chloride or the like with excellent chemical resistance, and a concave section 24 is formed in the upper section of the mounting section 22, with a diaphragm 25 formed in the shape of a circular cylinder with a closed base being provided inside this concave section 24. The diaphragm 25 is formed from polytetrafluoroethylene (fluoroplastics) or a vinyl chloride or the like with excellent chemical resistance, and the outer periphery thereof is formed as a concertina shaped compressible bellows section 26, and the pressure of the fluid flowing through the pipeline 1 is transmitted to the base of the diaphragm 25 via a pressure detection aperture 27 formed in the mounting section 22.

A flange 31 is formed at the top edge of the diaphragm 25, and this flange 31 engages with a stepped section 32 formed on the edge of the opening of the concave section 24 of the mounting section 22.

An O ring 33 is provided between the outer surface of the diaphragm 25 at the upper end of the bellows section 26, and the inner surface of the concave section 24 of the mounting section 22, and seals the gap between these two sections.

Figure 2:
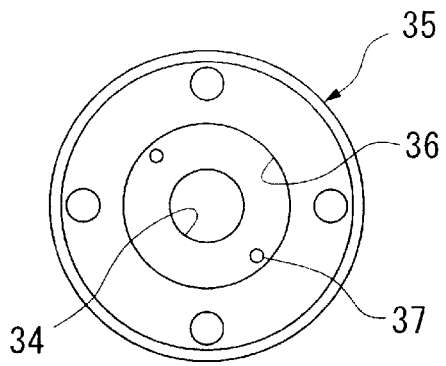
FIG. 2 is a top view of a stationary plate describing the shape of a stationary plate used in the construction of a pressure gauge of an embodiment of the present invention.
Figure 3:
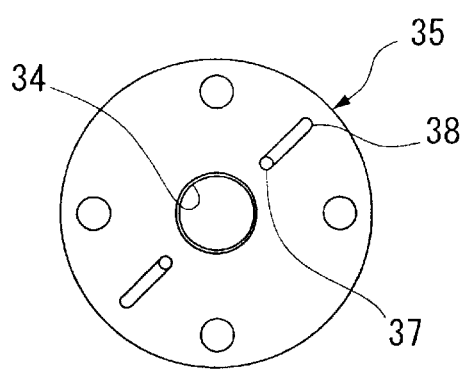
FIG. 3 is a bottom view of a stationary plate describing the shape of a stationary plate used in the construction of a pressure gauge of an embodiment of the present invention.

A stationary plate 35 with an aperture 34 formed in the center thereof is attached to the top of the mounting section 22. As shown in FIG. 2, the region surrounding the aperture 34 on the upper surface of this stationary plate 35 comprises an indented section 36, and air vent apertures 37 are formed within this indented section 36. As shown in FIG. 3, air vent channels 38 which interconnect with the air vent apertures 37 are formed along a radial direction on the bottom face of this stationary plate 35.

Figure 4:
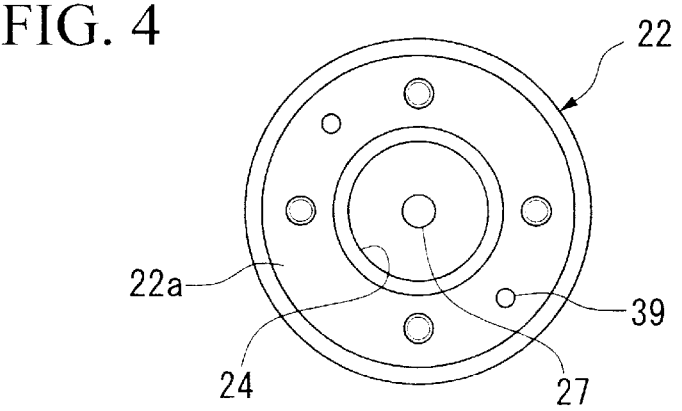
FIG. 4 is a top view of a mounting section describing the shape of a mounting section used in the construction of a pressure gauge of an embodiment of the present invention.

These air vent channels 38 formed in the stationary plate 35 interconnect with through apertures 39 which pass through a mounting flange 22a formed at the top edge of the mounting section 22, as can be seen in FIG. 4.

A protective cap 42 formed from polytetrafluoroethylene (fluoroplastics) or a vinyl chloride or the like with excellent chemical resistance is attached to the bottom end of an actuator rod 41 of the measurement section 23. A female screw thread 43 is formed inside this protective cap 42, and the protective cap 42 is fixed to the bottom end of the actuator rod 41 by screwing the cap onto a male screw thread 44 formed on the bottom end of the actuator rod 41.

The protective cap 42 attached to the bottom end of the actuator rod 41 is inserted down through the aperture 34 of the stationary plate 35 and an interconnecting housing aperture 25a of the diaphragm 25.

Figure 5:
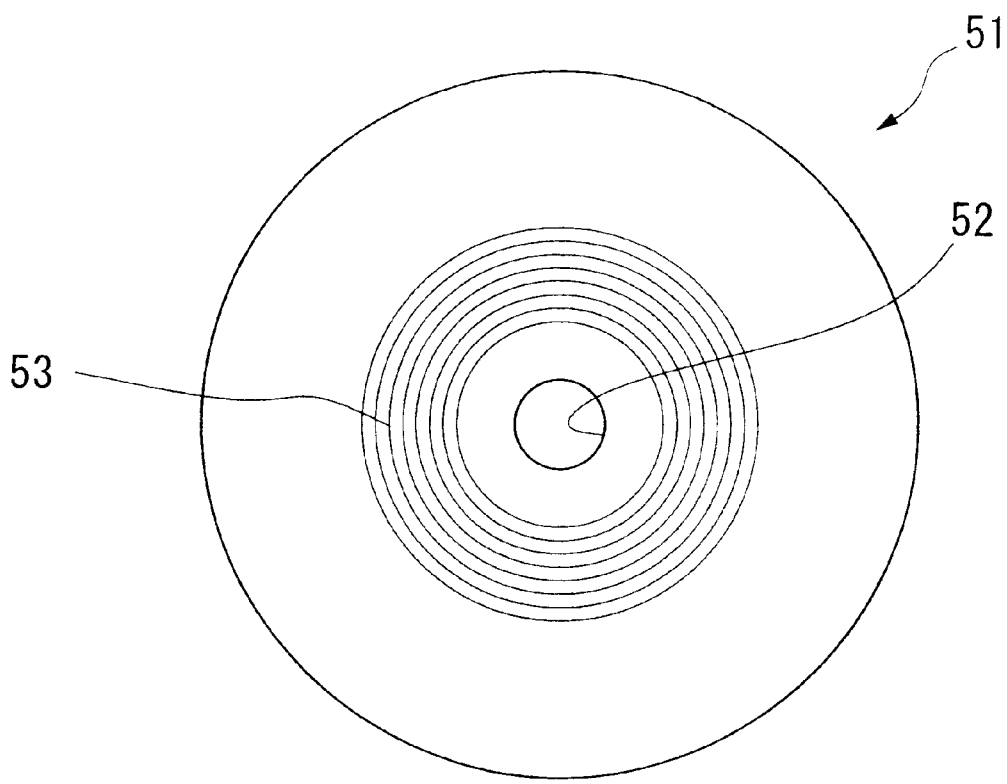
FIG. 5 is a plan view of a seal describing the shape of a seal used in the construction of a pressure gauge of an embodiment of the present invention.
Figure 6:
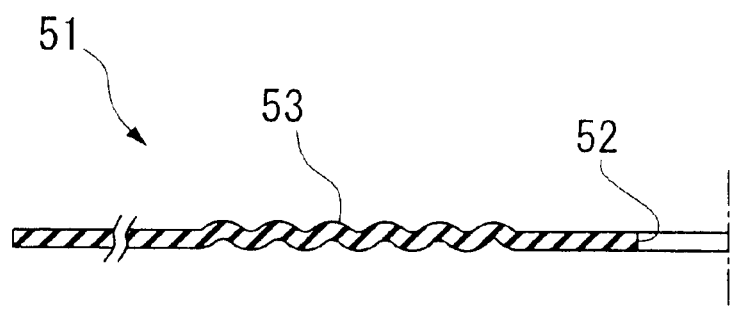
FIG. 6 is a cross-sectional view of a seal describing the shape of a seal used in the construction of a pressure gauge of an embodiment of the present invention.
Figure 7:
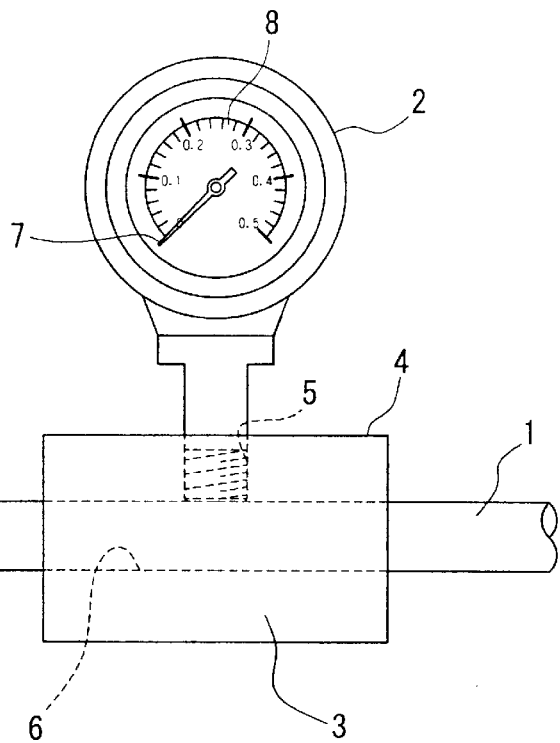
FIG. 7 is a front view of a pressure gauge attached to a pipeline describing the attachment of the pressure gauge.
Figure 8:
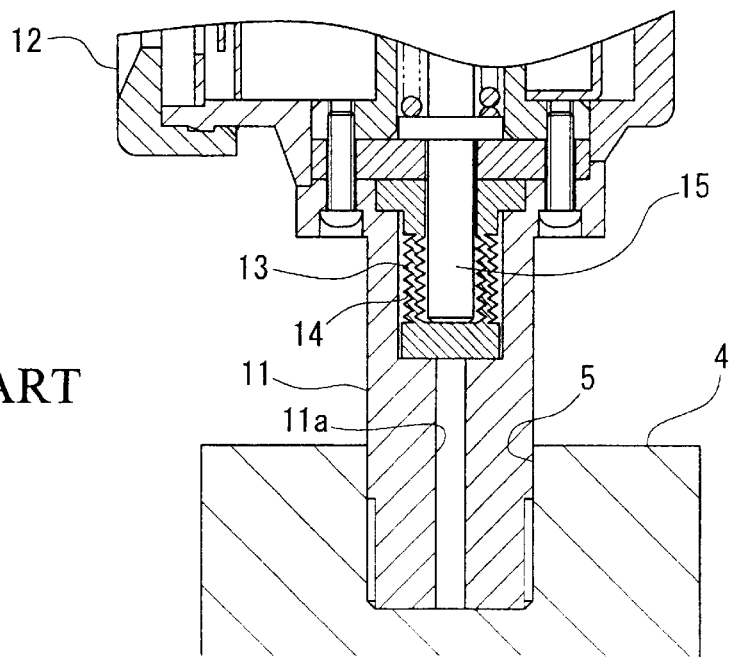
FIG. 8 is a partial cross-sectional view of a pressure gauge describing the formation and construction of a conventional pressure gauge.

A seal 51 such as that shown in FIG. 5 and FIG. 6 is provided between the actuator rod 41 and the protective cap 42. This seal 51 is formed from a sheet of rubber with excellent chemical resistance, and the actuator rod 41 is inserted through an insertion aperture 52 formed in the center of the seal 51. In this state, by screwing the protective cap 42 onto the bottom end of the actuator rod 41, the seal 51 is held in place between the upper edge of the protective cap 42 and a fixed flange 41a formed in the central region of the actuator rod 41.

Hollow sections 51a and 51b are formed on the upper and lower surfaces of the seal 51 in the region surrounding the actuator rod 41, and a slack section (corrugated section) 53 which is formed as concentric wave shapes and provides a certain degree of slack in a radial direction is formed in a location which corresponds with the position of the hollow sections 51a and 51b.

The hollow section 51a formed on the upper surface of the seal 51 is connected to the exterior via an insertion apertures 63b in a protective cover 62 described below, and the hollow section 51b formed on the lower surface of the seal 51 is connected to the exterior via the aforementioned air vent apertures 37, the air vent channels 38 and interconnecting apertures 39.

The protective cover 62 covers the top of the stationary plate 35, with a packing ring 61 formed from a synthetic resin or the like disposed therebetween, and the outer periphery of the seal 51 is sandwiched between the stationary plate 35 and the packing ring 61.

A circular cylindrical section 63 is formed on the protective cover 62, and a compression spring 64 for pressing the actuator rod 41 downwards is provided between a bottom section 63a of this circular cylindrical section 63 and the fixed flange 41a of the actuator rod 41.

The insertion aperture 63b is formed in the bottom section 63a of the circular cylindrical section 63 of the cover 62, and the top end of the actuator rod 41 is inserted through this insertion aperture 63b and protrudes out the top of the protective cover 62.

The mounting section 22, the stationary plate 35, the packing ring 61 and the protective cover 62 are held together as a single unit by a set screws 65.

An L shaped bracket 71 is fixed to the protective cover 62 via screws 66, and a mechanism 72 forming the measurement section 23 is fixed to this bracket 71.

This mechanism 72 comprises parallel support plates 74 separated by a stay 73, and a rotation shaft 75 is supported between these support plates 74 in a freely rotatable manner.

A gear 76 is provided in the central region of the rotation shaft 75, and this gear 76 engages with a rack member 77.

The tip of an actuator pin 79, which is connected to the top end of the actuator rod 41, is positioned at the bottom of the rack member 77, with a flat spring 78 disposed therebetween.

When the actuator rod 41 is pushed upwards, the actuator pin 79 at the top end of the actuator rod 41 pushes up against the resistance of the flat spring 78 and lifts the rack member 77, and as a result, the rotation shaft 75, comprising the gear 76 which engages with this rack member 77, begins to rotate.

A display needle 81 is fixed to one end of the rotation shaft 75, and this needle rotates together with the rotation shaft 75.

A display panel 82 with graduations labeled thereon is provided behind the display needle 81, and the pressure can be confirmed visually by looking at the position of the display needle 81.

Reference symbol 83 in the diagram denotes a housing for the measurement section 23.

In a pressure gauge 21 of the above construction, when a fluid flows through the pipeline 1, the pressure of the fluid is transmitted to the diaphragm 25 via the pressure detection aperture 27, and the spiral section 26 compresses while the base of the diaphragm 25 is forced upwards.

As a result, the actuator rod 41 and the attached protective cap 42 housed inside the housing aperture 25a of the diaphragm 25 are forced upwards against the resistance of the compression spring 64, and the rack member 77 is forced upwards by the actuator pin 79 provided on the top end of the actuator rod 41, via the flat spring 78. This causes the rotation shaft 75 to rotate, and the display needle 81 also rotates in accordance with this degree of rotation, and the graduations provided on the display panel 82 then indicate the pressure of the fluid.

By simply looking at the graduation on the display panel 82 indicated by the display needle 81 of the pressure gauge 21, the pressure of the fluid within the pipeline 1 can be confirmed with ease.

According to the pressure gauge 21 of the above embodiment, because the tip of the actuator rod 41 housed within the housing aperture 25a of the diaphragm 25 is covered with the protective cap 42 formed from polytetrafluoroethylene resin or a vinyl chloride or the like with excellent chemical resistance, even if a corrosive fluid undergoes gas permeation through the bellows section 26 of the diaphragm 25, any direct contact with the actuator rod 41 is prevented, and as a result, measurement errors and any reduction in the lifespan of the gauge resulting from corrosion of the actuator rod 41 can be prevented.

In addition, the space between the mounting section 22 and the measurement section 23 is partitioned with the flexible, corrosion resistant seal 51, and so any gaseous fluid which permeates the bellows section 26 of the diaphragm 25 on the mounting section 22 can be prevented from reaching the measurement section 23 without hindering the movement of the actuator rod 41, meaning measurement errors and any reduction in the lifespan of the gauge resulting from corrosion of the measurement section 23 can be prevented with even greater certainty.

Furthermore, because the seal 51 around the periphery of the actuator rod 41 comprises the slack section 53 which displays a degree of slack in a radial direction, any obstruction of the movement of the actuator rod 41 resulting from the provision of the seal 51 can be almost completely prevented.

In addition, because the hollow sections 51a and 51b formed in the top and bottom of the seal 51 link through to the open air, when the seal 51 deforms as a result of following the movement of the actuator rod 41, any pressure variation between the top and bottom of the seal 51 can be minimized, enabling any obstruction of the movement of the actuator rod 41 resulting from the provision of the seal 51 to be even more completely prevented.

Furthermore, the O ring 33 provided between the outer surface of the diaphragm 25 at the upper end of the bellows section 26 and the inner surface of the concave section 24 of the mounting section 22 completely prevents any leakage of fluid through the gap between these two sections, thereby completely preventing any deleterious effects on the measurement section 23 resulting from such leaked fluid.

What is claimed is:

1. A pressure gauge which measures pressure of a fluid flowing through a pipeline, comprising:
   a mounting section which can be connected to said pipeline and has a concave section therein which interconnects with an inside of said pipeline when said mounting section is connected to said pipeline, a measurement section which is provided on said mounting section;

an actuator rod which is provided in said measurement section and causes a rotation of a display needle by movement thereof in an axial direction of said actuator rod, and a diaphragm which is provided inside said concave section and has a base section, wherein said diaphragm comprises a compressible bellows section closed by said base section, and a housing aperture which houses a tip of said actuator rod, so that when fluid pressure within said pipeline acts upon said base section of said diaphragm, said diaphragm is compressed by said fluid pressure to move said actuator rod in said axial direction, and said tip of said actuator rod housed within said housing aperture of said diaphragm is covered by a corrosion resistant protective cap.

2. A pressure gauge according to claim 1, wherein a flexible, corrosion resistant seal is provided between said mounting section and said measurement section for partitioning said two sections, said actuator rod is inserted through a center of said seal, and said seal is held in place between a fixed flange formed in a central region of said actuator rod and said protective cap.

3. A pressure gauge according to claim 2, wherein said seal around a periphery of said actuator rod comprises a slack section with a degree of slack in a radial direction.

4. A pressure gauge according to claim 2, wherein a top and bottom of said seal around a periphery of said actuator rod comprise hollow sections which link through to open air.

5. A pressure gauge according to claim 3, wherein a top and bottom of said seal around a periphery of said actuator rod comprise hollow sections which link through to open air.

6. A pressure gauge according to claim 1, wherein an O ring is provided between an outer periphery of said diaphragm at an upper end of said bellows section, and an inner periphery of said concave section of said mounting section.

* * * * *